United States Patent
Krupin et al.

(10) Patent No.: US 6,592,830 B1
(45) Date of Patent: Jul. 15, 2003

(54) TREATING NIOBIUM AND OR TANTALUM CONTAINING RAW MATERIALS

(75) Inventors: Aleksandr Krupin, Öismäe tee 36-39, Tallinn/Estonia (EE); Nikolai Galaganov, Tallinn (EE)

(73) Assignee: Aleksandr Krupin, Tallin (EE)

( * ) Notice: Subject to any disclaimer, the term of this patent is extended or adjusted under 35 U.S.C. 154(b) by 0 days.

(21) Appl. No.: 09/807,702

(22) PCT Filed: Oct. 20, 1999

(86) PCT No.: PCT/SE99/01888

§ 371 (c)(1),
(2), (4) Date: Apr. 17, 2001

(87) PCT Pub. No.: WO00/24943

PCT Pub. Date: May 4, 2000

(30) Foreign Application Priority Data

Oct. 26, 1998 (SE) .............................................. 98036593

(51) Int. Cl.$^7$ .......................... C01G 33/00; C01G 35/00
(52) U.S. Cl. ........................................... 423/66; 423/67
(58) Field of Search .............................. 423/68, 62, 65, 423/66, 67

(56) References Cited

U.S. PATENT DOCUMENTS 4,309,389 A * 1/1982 Meyer .......................... 423/62
5,023,059 A * 6/1991 Bielecki et al. ................ 423/68
5,787,332 A 7/1998 Black et al. .................... 423/9

OTHER PUBLICATIONS

File WPI, Derwent Accession No. 1998–592958, Irkut Rare Nonferr Metals Res Inst: "Processing of Tantalum Concentrates—Involves Washing Product–Precipitate of Neutralization with Ammonium Sulphate Solution, Hot Water, and Ethanol"; & RU, C1, 2111274, 19980520, Abstract, No Date.

* cited by examiner

*Primary Examiner*—Steven Bos
(74) *Attorney, Agent, or Firm*—Ladas and Parry

(57) ABSTRACT

The invention relates to a process for treating tantalum and/or niobium containing raw materials such as wastes, slags, concentrates and ores. The tantalum and/or niobium containing raw materials are processed by repeated use of a solution of ammonium fluoride. From the tantalum and niobium containing aqueous solution a mixture of fluorides and oxide fluorides of tantalum and niobium are transformed into a firm condition. At an extraction stage pure, aqueous solutions containing fluoro acid complexes of niobium and fluoroammonium complexes of tantalum are obtained. From these tantalum and niobium are obtained as oxides in pure form by precipitating them as fluoride containing oxide hydrates by addition of ammonia. The obtained oxide hydrates are transformed into pure oxides by calcining at high temperatures.

13 Claims, No Drawings

TREATING NIOBIUM AND OR TANTALUM CONTAINING RAW MATERIALS

The invention relates to a process for treating tantalum and/or niobium containing raw materials such as wastes, slags, concentrates, and ores. The invention also relates to regeneration of fluoride ions and ammonium and to recycling them into the process of the invention. At the same time particular account is taking of environmental protection by eliminating harmful waste materials.

Decomposition methods of tantalum and niobium containing raw material in form of, for example, ores, slags and concentrates received from them, or wastes of any origin by chemical and/or metallurgical processes are known.

According to the known chemical processes, tantalum and niobium containing materials are dissolved in mineral acids by adding hydrofluoric acid and by simultaneous heating. Solutions containing niobium and tantalum, in form of their complex fluoro acids and loaded with raw material still in firm condition after the decomposition process and other impurities are received.

The selective separation of fluoride components of tantalum and niobium takes place according to known methods by multistage liquid extraction, during which simultaneously, during re-extraction from organic phase, separation of fluoro acids of tantalum and niobium is achieved by choice of a suitable concentration of hydrofluoric acid in aqueous phase. Such processes are described, for example, in the U.S. Pat. No. 3,117,833, U.S. Pat. No. 2,953,453 and U.S. Pat. No. 2950966. According to a known process described in the patent DE 4207145 tantalum is extracted as its fluoro acid from an aqueous solution of niobium fluoro acid.

Proceeding from the pure aqueous solutions of the complex tantalum and niobium fluoro acids in the known methods, tantalum and niobium are obtained as oxides in pure form by precipitating them from aqueous solutions as fluoride containing oxide hydrates by adding ammonia and transformation of the received oxide hydrates into pure oxides by calcining at higher temperatures.

Naturally, large amounts of waste waters containing ammonium fluoride accumulate in this known process. This either leads to environmental pollution or requires special steps in order to recover ammonia by reaction with calcium lime, and to deposit the fluoride in a harmless form as a deposable fluorite slurry.

Besides, the known process requires for its realization constant use of fresh hydrofluoric acid in a volume necessary for dissolution of tantalum and niobium containing raw materials and also for realizing separation extraction. The obtained solution is exposed to multistage liquid extraction, which provides complete extraction of tantalum and niobium from the raffinate solution. However, it does not guarantee the required quality of the tantalum and niobium compounds.

In order to get the required quality of the tantalum and niobium compounds their aqueous solutions of complex fluoro acids undergo additional purification by repeated multistage liquid extraction, and it, in turn, results in an increase of costs for expensive chemicals and an increase of costs for neutralization of liquid wastes.

According to the known process, precipitation of oxide hydrates of tantalum and niobium is carried out well enough while the obtained solutions of ammonium fluoride are wastes and no extraction from them of tantalum and niobium is made. The given precipitation is made in conditions, when all mixture elements are co-precipitated together with deposits of oxide hydrates of tantalum and niobium.

In the present invention the usual dissolution of tantalum and/or niobium containing materials in mineral acids is avoided together with all its defects. At the same time fluoride ions and ammonia are recovered and recycled into the process. The extraction raffinates are repeatedly used as employable liquid for separation of tantalum and niobium by multistage liquid extraction.

The purpose of the present invention is to eliminate or reduce the above drawbacks. A further purpose is to achieve a less expensive process. Additional purposes and improvements will be appreciated by a person skilled in the art when reading the detailed description below.

In the description all stated percentages are weight-%, if not explicitly stated otherwise.

The tantalum and niobium containing raw material is processed by use of a solution of ammonium fluoride recovered from the process at a temperature up to the boiling point (239° C.) for not more than 10 hours (examples 1–4).

It is not expedient to increase the temperature and to increase the time of decomposition. If said temperature is increased and the time of treatment is more than 10 hours it leads to intensive extraction of ammonium fluoride out from the reaction zone and into a gas phase. This will firstly complicate the process of gas cleaning and, secondly, it will require increased amounts of ammonium fluoride for decomposition of the raw materials.

The necessary quantity of ammonium fluoride for decomposition of tantalum and niobium raw materials is calculated based on formation of ammonium fluorite complex compounds of all elements which are included in the structure of the given raw materials. In order to achieve full decomposition of tantalum and niobium raw materials it is expedient to use a surplus of ammonium fluoride. Thus in examples 1–4 ammonium fluoride is used in a surplus of 1.5–2.5 times. However, this surplus is not compulsory and is only given as an example.

At the stage of decomposition ammonia and ammonium fluoride are transformed into gas phase.

The ammonia is formed while the elements of oxides that the raw materials contain undergo fluoridation, and also in the process of transition of ammonium fluoride to ammonium hydrofluoride when the solution of ammonium fluoride is evaporated during the process of decomposition.

The ammonium fluoride is transformed into gas phase mainly owing to thermal decomposition of ammonium fluoride complex compounds of mixture elements formed during the treatment of the raw materials.

From gas phase ammonia is recovered as 1.0–28% aqueous solution by the method of condensation (solutions (1.4), (1.6), (2.4) and (2.6) in examples 1 and 2) and it is used repeatedly during ammoniac precipitaion (for example 20–28% aqueous solution) and during scrubbing (for example 1.5% aqueous solution) of tantalum or niobium containing precipitates (examples 7 and 8), and also during scrubbing of the sediments of the mixture elements (examples 3 and 4).

A 1.0–1.5% aqueous solution of ammonia (for example solution 2.4 from example 2) as well as circulating water can be used during the operation of leaching (example 4).

The ammonium fluoride is recovered from gas phase by the method of condensation and absorption of an aqueous solution containing ammonium fluoride (solutions 1.5 and 2.5 in examples 1 and 2) in an amount of about 200 g/l.

At the stage of decomposition of tantalum and niobium containing raw materials, the mixture elements, contained in the raw materials, are extracted like almost insoluble oxides, oxide fluorides or fluorides (precipitates 1.3; 2.3; 3.3 and 4.3 in examples 1–4), which after calcining are deposable waste products (example 1).

At the stage of decomposition and leaching aqueous solutions are obtained containing fluoro tantalum and fluoro niobium complexes of ammonium (solutions 1.1; 1.2; 2.1; 2.2; 3.1; 3.2; 4.1 and 4.2 in examples 1–4).

The scrub solutions containing considerable quantities of mixture elements (for example solutions 1.2 and 2.2 in examples 1 and 2) are expedient to use at the stage of decomposition of tantalum and niobium containing raw materials as a solution of ammonium fluoride (example 4).

From pure tantalum and niobium containing aqueous solutions (for example 1.1; 2.1; 3.1 and 4.1 in examples 1–4) the mixture of fluorides and oxide fluorides of tantalum and niobium is consistently extracted into solid condition:

by ammoniac precipitation of ammonium fluoride complex salts of tantalum and niobium with the help of circulating 20–28% ammonia solution;

by scrubbing the allocated salts.with water or 1.0–1.5% ammonia solution (it is expedient to use water for lowering the hydrolysis of fluoride salts); and by drying/calcination of ammonium fluoride complex salts of tantalum and niobium with the purpose of decomposition of ammonium complexes up to full removal of ammonia from the solid phase (examples 5 and 6).

The precipitation of tantalum and niobium like their fluoride-containing salts from aqueous solution can be carried out in conditions of complete precipitation (example 5), and in conditions of incomplete precipitation (example 6). It is more preferable to use the conditions of incomplete precipitation because then the amount of ammonia used for precipitation is lower and the obtained precipitates contain more fluoride ions relatively to the sum of tantalum and niobium.

Drying/calcination is carried out at a high temperature not higher than 450° C. during not more than 2 hours.

It is not expedient to increase the temperature or the time, because if the temperature is higher than 450° C. and the time of treatment is longer than 2 hours sublimation of fluorite compounds of tantalum and niobium into gas phase is noticeable, and this lowers the direct extraction of tantalum and niobium and thus leads to a rise in the costs of the process as a whole.

The thus obtained mixture of fluorides and oxide fluorides of tantalum and niobium (sediments 5.2 and 6.2 in examples 5 and 6) is treated by reused extraction raffinate, that does not contain considerable quantity of mixture elements, in order to get the solution deposable for selective separation of fluoro compounds of tantalum and niobium (examples 7 and 8).

Accumulation of mixture elements at the stage of extraction separation of tantalum and niobium is excluded by extracting approximately 1/20–1/25 parts of extracted raffinate from the extraction system, and at the same time the part extracted from the system raffinate is used in a technological process for clearing ammoniac gas emissions (examples 7 and 8).

The stage of extraction separation (examples 7 and 8) is carried out according to known methods (for example patents DE 402107, U.S. Pat. No. 5,209,910 and DE 4207145 without use of a sulphuric acid) and pure aqueous solutions containing fluoroacid complexes of niobium (for example solution 7.1) and fluoro ammonium complexes of tantalum (for example solution 7.2) are obtained.

Oxides of tantalum (7.2.1) and niobium (7.1.1) are released in pure form from the obtained solutions by precipitation as fluoride containing oxide hydrates by adding; ammonia and transformation the thus obtained oxide hydrates into pure oxides by calcining at high temperature (example 7).

In the process the solutions of ammonium fluoride are formed:

by condensation of a gas phase at the stage of decomposition of tantalum and niobium ore (solutions (1.5) and (2.5) in examples 1 and 2);

in a filtrate after ammoniac precipitating of fluoride containing tantalum and niobium sediment (5.2) and (6.2) from aqueous solutions (1.1), (2.1), (3.1), (4.1), containing fluoro tantalum and fluoro niobium complexes of ammonium, (examples 5 and 6);

in a filtrate after oxide hydrates of tantalum and niobium are precipitated by solutions of ammonia from tantalum and niobium re-extracts (solutions (7.1.2), and (7.2.2) in example 7); and a clearing of the gas phase from ammonia compounds by using approximately 1/20–1/25 parts of a fully extracted raffinate solution (for example solution (7.3) in example 7) for the operations:

when tantalum and niobium containing ores are decomposed;

when fluoride containing sediment of the mixture elements are being dried and calcinated;

when fluoride containing tantalum and niobium sediment are being dried and calcinated; and when oxides of tantalum and niobium are being dried and calcinated.

All selected solutions of ammonium fluoride are reused directly at the stage of decomposition of the tantalum and niobium containing raw material, or at the stage of scrubbing the sediment of mixture elements.

In the process of the invention there is a loss of fluoride ions with the sediment of mixture elements, the quantity of which is not more than 25% of the whole quantity of fluoride ions necessary for decomposition of the raw materials. The quantity of the losses of fluoride ions depends on the element structure of the impurities in the initial tantalum and/or niobium containing raw materials. The losses of fluoride ions in the process is compensated by adding fresh 40–70% hydrofluoric acid at the stage when the solutions for extraction separation of tantalum and niobium is being prepared, or at the stage of extraction when the scrubbing solutions are being prepared (examples 7 and 8) or also by adding fresh ammonium fluoride salts in solid form or dissoluted at the stage of decomposition of the tantalum and/or niobium containing raw materials (examples 1–4).

EXAMPLE 1

2.5 kg of a tantalum and niobium ore (A), containing 43.88% $Ta_2O_5$; 24.45% $Nb_2O_5$; 12.26% $Fe_2O_3$; 6.44% $MnO_2$; 2.70% $TiO_2$, the remainder being small amounts of other substances (impurities), were processed by 13.9 liters of a solution containing approximately 460 g/l ammonium fluoride at a temperature not higher than 239° C. (the boiling point) in 5 hours. The thus obtained mixture was leached by 7.0 liters of water at a temperature lower than 100° C. in not more than one hours. After the leaching the fluorite solution was separated by filtering from the insoluble precipitate, which was scrubbed by 6.5 liters of water. After scrubbing the scrub water was separated by filtering from the insoluble precipitate, which then was dried at the temperature of 105–110° C. in 2 hours and was calcinated at the temperature of 850–900° C. in 1.0 hour.

There from resulted:

1.1) 7.0 liters of a main filtrate, containing 126.88 g/l $Ta_2O_5$; 59.4 g/l $Nb_2O_5$; <0.05 g/l $Fe_2O_3$; 0.045 g/l $MnO_2$ and 0.23 g/l $TiO_2$ (corresponding to a yield in the main filtrate of about: 80.73% $Ta_2O_5$; 68.08% $Nb_2O_5$; <0.05% $Fe_2O_3$; 0.18% $MnO_2$; 2.39% $TiO_2$);

1.2) 7.0 liters of a scrubbing solution, containing 30.0 g/l $Ta_2O_5$; 27.7 g/l $Nb_2O_5$; 6.14 g/l $Fe_2O_3$; 0.214 g/l $MnO_2$ and 0.36 g/l $TiO_2$ (corresponding to a yield in the scrubbing solution of about: 19.9% $Ta_2O_5$; 31.73% $Nb_2O_5$; 14.02% $Fe_2O_3$; 0.93% $MnO_2$; 3.73% $TiO_2$);

1.3) 0.65 kg of a dry insoluble precipitate containing if recalculated in oxides 0.64% $Ta_2O_5$; 0.15% $Nb_2O_5$; 40.54% $Fe_2O_3$; 24.49% $MnO_2$; 9.75% $TiO_2$; the rest are other substances (impurities) (corresponding to a yield in the insoluble precipitate from initial ore of: 0.38% $Ta_2O_5$; 0.16% $Nb_2O_5$; 85.97% $Fe_2O_3$; 98.87% $MnO_2$; 93.89% $TiO_2$). In order to determine its deposability one part of the precipitate was mixed with two parts of distilled water and left for some hours. The result showed that the wastes can be safely deposited.

The following was released from a gas phase by condensation at different temperatures and at different stages of decomposition:

1.4) 0.59 liters of a solution containing about 10–15 g/l ammonia;

1.5) 3.75 liters of a solution containing about 200 g/l ammonium fluoride;

1.6) 4.32 liters of a solution containing about 268 g/l ammonia.

EXAMPLE 2

2.5 kg of a tantalum and niobium ore (B) containing 8.42% $Ta_2O_5$; 16.53% $Nb_2O_5$; 26.95% $Fe_2O_3$; 29.94% $MnO_2$; 3.70% ZnO; 5.51% $SnO_2$; 1.71% $Ce_2O_3$; 2.08% $ThO_2$; 2.66% CaO, the remainder being small amounts of other substances (impurities), were processed by 20 liters of a solution containing about 250 g/l ammonium fluoride, at a temperature not higher than 239° C. in 8 hours. The thus obtained mixture was then leached by 3.5 liters of water at a temperature lower than 100° C. in not longer than 1 hour. After the leaching the fluorite solution was separated by filtering from an insoluble precipitate, that was scrubbed by 2.5 liters of water. After scrubbing the scrub water was separated by filtering from the insoluble precipitate, which then was dried at the temperature of 105–110° C. in 2 hours and calcinated at the temperature of 850–900° C. in 1.0 hour.

Thus it was obtained:

2.1) 4.5 liters of a main filtrate, containing 37.33 g/l $Ta_2O_5$; 78.01 g/l $Nb_2O_5$; <0.05 g/l $Fe_2O_3$; 0.05 g/l $MnO_2$; <0.05 g/l ZnO; <0.05 g/l $SnO_2$; <0.05 g/l $Ce_2O_3$; <0.05 g/l CaO; <0.05 g/l $ThO_2$ (corresponding to a yield in the main filtrate of about: 79.99% $Ta_2O_5$; 84.98% $Nb_2O_5$; 0.03% $MnO_2$; <0.05% $Fe_2O_3$; <0.05% $ZnO_3$; <0.05% $SnO_2$; <0.05% $Ce_2O_3$; <0.05% CaO; <0.05% $ThO_2$);

2.2) 2.5 liters of a scrubbing solution, containing 16.8 g/l $Ta_2O_5$; 23.57 g/l $Nb_2O_5$; 29.6 g/l $Fe_2O_3$; 11.02 g/l $MnO_2$; <0.05 g/l ZnO; <0.05 g/l $SnO_2$; <0.05 g/l $Ce_2O_3$; <0.05 g/l CaO; <0.05 g/l $ThO_2$ (corresponding to a yield in the scrubbing solution of about: 20.0% $Ta_2O_5$; 14.27% $Nb_2O_5$; 10.98% $Fe_2O_3$; 3.68% $MnO_2$; <0.05% ZnO; <0.05% $SnO_2$; <0.05% $Ce_2O_3$; <0.05% CaO; <0.05% $ThO_2$).

2.3) 2.2 kg of a dry insoluble precipitate containing if recalculated in oxides: <0.005% $Ta_2O_5$; 0.14% $Nb_2O_5$; 27.28% $Fe_2O_3$; 32.81>% $MnO_2$; 4.2% ZnO; 6.27% $SnO_2$; 1.94% $Ce_2O_3$; 3.02% CaO; 2.36% $ThO_2$; the remainder being small amounts of other substances (impurities) (corresponding to a yield in the insoluble precipitate from the initial ore of about: <0.01% $Ta_2O_5$; 0.74% $Nb_2O_5$; 88.97% $Fe_2O_3$; 96.29% $MnO_2$; 299.95% ZnO; 299.95% $SnO_2$; 299.95% $Ce_2O_3$; >99.95% CaO; >99.95% $ThO_2$).

The following was released from a gas phase by condensation at different temperatures and at different stages of decomposition:

2.4) 4.0 liters of a solution containing about 10–15 g/l ammonia;

2.5) 4.6 liters of a solution containing about 200 g/l ammonium fluoride;

2.6) 5.3 liters of a solution containing about 256 g/l ammonia.

EXAMPLE 3

2.5 kg of a tantalum and niobium ore (A) were processed in 17.0 liters of a solution containing about 380 g/l ammonium fluoride at a temperature not higher than 239° C. in 8 hours. The obtained mixture was then exposed to leaching by 7.0 liters of water at a temperature below 100° C. in not more than 1.0 hour. After leaching the fluorite solution was separated by filtering from the insoluble precipitate, which was scrubbed two times by 3.75 liters of a solution (1.5), containing about 200 g/l ammonium fluoride the first time, and by 2.75 liters of solution containing about 10–15 g/l ammonia the second time. After scrubbing the scrub water was separated by filtering from the insoluble precipitate, which was then dried at a temperature of 105–110° C. in 2.0 hours and calcinated at a temperature of 850–900° C. in 1.0 hour.

Thus it was obtained:

3.1) 7.0 liters of a main filtrate, containing 117.61 g/l $Ta_2O_5$; 76.19 g/l $Nb_2O_5$; <0.05 g/l $Fe_2O_3$; 0.038 g/l $MnO_2$ and 0.27 g/l $TiO_2$; (corresponding. to a yield in the main filtrate of about: 75% $Ta_2O_5$; 87.25% $Nb_2O_5$; <0.05% $Fe_2O_3$; 0.165% $MnO_2$; 2.8% $TiO_2$).

3.2) 7.0 liters of a scrub solution, containing 38.5 g/l $Ta_2O_5$; 11.01 g/l $Nb_2O_5$; 2.31 g/l $Fe_2O_3$; 0.08 g/l $MnO_2$ and 0.31 g/l $TiO_2$; (corresponding to a yield in the scrub solution of about: 24.57% $Ta_2O_5$; 12.61% $Nb_2O_5$; 5.27% $Fe_2O_3$; 0.35% $MnO_2$; 3.20% $TiO_2$).

3.3) 0.62 kg of a dry insoluble precipitate containing if recalculated in oxides: 0.68% $Ta_2O_5$; 0.14% $Nb_2O_5$; 46.82% $Fe_2O_{3p}$; 25.83% $MnO_2$; 10.23% $TiO_2$, the remainder being small amounts of other substances (impurities) (corresponding to a yield in the insoluble precipitate of about: 0.38% $Ta_2O_5$; 0.14% $Nb_2O_5$; 94.71% $Fe_2O_3$; 99.48% $MnO_2$; 94.0% $TiO_2$).

EXAMPLE 4

2.5 kg of a tantalum and niobium ore (B) were processed in a mixture of 20 liters of a solution containing about 250 g/l ammonium fluoride, and 2.5 liters of a scrub solution (2.2) at a temperature not higher than 239° C. in 9 hours. The thus obtained mixture was exposed to leaching by 3.5 liters of a solution (2.4) at a temperature below 100° C. in not more than 1 hour. After the leaching a fluorite solution was separated by filtering from the insoluble precipitate, which was twice scrubbed by 2 liters of a first solution (2.5) during the first step and by 0.5 litre of another solution (2.4) during the second step. After scrubbing the scrub water was separated by filtering from the insoluble precipitate, which was then dried at the temperature of 105–110° C. in 2 hours and calcinated at the temperature of 850–900° C. in 1 hour.

Thus it was obtained:

4.1) 4.8 liters of a main filtrate, containing 44.08 g/l $Ta_2O_5$; 83.93 g/l $Nb_2O_5$; 0.042 g/l $MnO_2$; <0.05 g/l $Fe_2O_3$; <0.05 g/l ZnO; <0.05 g/l $SnO_2$; <0.05 g/l $Ce_2O_3$; <0.05 g/l CaO; <0.05 g/l $ThO_2$ (corresponding to a yield in the solution from the mixture of ore and solution (2.2) and from the ore of about: 83.96% (100.75% ore) $Ta_2O_5$; 85.36% (97.54%) $Nb_2O_5$; 0.026% (0.0267%) $MnO_2$; <0.05% $Fe_2O_3$; <0.05% ZnO; <0.05% $Ce_2O_3$; <0.05% CaO; <0.05% $ThO_2$).

4.2) 3.0 liters of a scrub solution, containing 13.47 g/l $Ta_2O_5$; 22.01 g/l $Nb_2O_5$; 0.11 g/l $MnO_2$; 2.53 g/l $Fe_2O_3$; <0.05 g/l ZnO; <0.05 g/l $SnO_2$; <0.05 g/l $Ce_2O_3$; <0.05 g/l CaO; <0.05 g/l $ThO_2$ (corresponding to a yield in the scrub solution from the mixture of ore and solution (2.2) of about: 16.03% $Ta_2O_5$; 13.99% $Nb_2O_5$; 0.042% $MnO_2$; 1.015% $Fe_2O_3$; <0.05% ZnO; <0.05% $SnO_2$; <0.05% $Ce_2O_3$; <0.05% CaO; <0.05% $ThO_2$).

4.3) 2.0 kg of the dry insoluble precipitate containing if recalculated in oxides: <0.005% $Ta_2O_5$; 0.152% $Nb_2O_5$; 38.80% $MnO_2$; 37.02% $Fe_2O_3$; the remainder being other substances (impurities) (corresponding to a yield in the insoluble precipitate from the mixture of ore and solution (2.2) of about: <0.01% $Ta_2O_5$; 0.65% $Nb_2O_5$; 99.95% $MnO_2$; 98.98% $Fe_2O_3$; >99.95% other substances).

EXAMPLE 5

7.0 liters of a tantalum and niobium solution containing 114.78 g/l $Ta_2O_5$; 53.90 g/l $Nb_2O_5$; 0.42 g/l $Fe_2O_3$; 0.06 g/l $MnO_2$; 0.14 g/l $TiO_2$ and prepared by mixing the main filtrate and the scrub solution in definite proportions according to examples 1–4 were processed by 2.45 liters of a solution ((1.6) or (2.6)) in not more than 30 minutes with no heating. After neutralization the sediment was separated by filtering from the mother liquor and scrubbed by 0.6 litre of water. The mother liquor and scrub solution were combined, and the sediment was dried and calcinated at a temperature not higher than 450° C. in not more than 2.0 hours.

The following was obtained:

5.1) 7.35 liters of a solution of ammonium fluoride containing: <0.05 g/l $Ta_2O_5$; 0.651 g/l $Nb_2O_5$; 0.236 g/l $Fe_2O_3$; 0.052 g/l $MnO_2$; 0.09 g/l $TiO_2$; 285 g/l $NH_4F$.

5.2) 1.4 kg of a tantalum niobium sediment containing if recalculated in oxides: 57.36% $Ta_2O_5$; 26.6% $Nb_2O_5$; 0.086% $Fe_2O_3$; 0.003% $MnO_2$; 0.023% $TiO_2$; balance F. This product can be used in other technical processes.

EXAMPLE 6

4.8 liters of a tantalum and niobium containing fluorite solution (4.1) were processed by 1.2 liters of a solution (2.6) in not more than 30 minutes with no heating. After separation from the mother liquor by filtering, the sediment was scrubbed by 0.3 liters of water, then it was dried and calcinated at a temperature not higher than 450° C. in not more than 2.0 hours. The mother liquor and the scrub water were combined.

Thus it was obtained:

6.1) 5.04 liters of a solution of ammonium fluoride containing: 0.648 g/l $Ta_2O_5$; 1.667 g/l $Nb_2O_5$; 0.035 g/l $Fe_2O_3$; 0.038 g/l $MnO_2$; 380 g/l $NH_4F$.

6.2) 0.73 kg of a tantalum and niobium sediment containing if recalculated in oxides: 28.46% $Ta_2O_5$; 53.89% $Nb_2O_5$; 0.009% $Fe_2O_3$; 0.002% $MnO_2$; balance F. This product can be used in other technical processes.

EXAMPLE 7

0.7 kg of a tantalum and niobium sediment (5.2) was dissolved in a mixture of 2.14 liters of a solution containing <0.05 g/l $Nb_2O_5$; <0.05 g/l $Ta_2O_5$; 4.95 g/l $Fe_2O_3$; 0.17 g/l $MnO_2$; 1.33 g/l $TiO_2$; 312 g/l $F_{total}$ and 0.64 liters fresh 40% HF.

As a result, 2.94 liters of a solution were obtained containing: 63.3 g/l $Nb_2O_5$; 136.6 g/l $Ta_2O_5$; 3.8 g/l $Fe_2O_3$; 0.13 g/l $MnO_2$; 0.97 g/l $TiO_2$; 396 g/l $F_{total}$; 240 g/l $HF_{free}$.

The obtained pure solution underwent.a multistage liquid extraction according to known methods (for example patents DE 402107, U.S. Pat. No. 5,209,910 and DE 4207145 without using sulphuric acid), during which separation compounds of tantalum and niobium was achieved in the form of their complex fluoro acids and fluorosalts in an aqueous solution.

Thus it was obtained:

7.1) 0.94 litre of a fluoride containing solution of niobium with 197.8 g/l $Nb_2O_5$, from which by adding a solution of ammonia (1.6) there were released:

7.1.1) oxide hydrate of niobium, which was calcinated at a temperature about 900° C. up to oxide of niobium containing: 99.84% $Nb_2O_5$; 0.006% $Ta_2O_5$; 0.002% $Fe_2O_3$; 0.0004% $MnO_2$; 0.003% $TiO_2$; 0.1% F;

7.1.2) a mother liquor containing about 253 g/l ammonium fluoride, and scrub water containing about 76 g/l ammonium fluoride;

7.2) 2.46 liters of a fluoride containing solution of tantalum with 162.9 g/l $Ta_2O_5$, from which by adding a solution of ammonia (1.6) were released:

7.2.1) oxide hydrate of tantalum, which was calcinated at a temperature about 900° C. up to oxide of tantalum containing: 99.93% $Ta_2O_5$; 0.004% $Nb_2O_5$; 0.001% $Fe_2O_3$; 0.0005% $MnO_2$; 0.001% $TiO_2$; 0.05% F.

7.2.2) a mother liquor containing about 226 g/l ammonium fluoride, and scrub water containing about 60 g/l ammonium fluoride;

7.3) 2.26 liters of fully extracted raffinate solution containing <0.05 g/l $Nb_2O_5$; <0.05 g/l $Ta_2O_5$; 4.95 g/l $Fe_2O_3$; 0.17 g/l $MnO_2$; 1.33 g/l $TiO_2$; the remaining is free hydrofluoric acid and amounts to, if recalculated in $F_{total}$, 312 g/l, from which 0.12 litre was used for clearing a gas phase from ammoniac compounds and later on during the operations of decomposition of the tantalum and niobium ores (A) and (B) in examples 1–4.

EXAMPLE 8

0.7 kg of a tantalum and niobium sediment (5.2) was dissolved in a mixture of 2.14 liters of a solution (7.3) containing: <0.05 g/l $Nb_2O_5$; <0.05 g/l $Ta_2O_5$; 4.95 g/l $Fe_2O_3$; 0.17 g/l $MnO_2$; 1.33 g/l $TiO_2$; 312 g/l $F_{total}$ and 0.64 litre fresh 40% HF.

As a result it was obtained 2.94 liters of a solution containing: 63.3 g/l $Nb_2O_5$; 136.6 g/l $Ta_2O_5$; 3.8 g/l $Fe_2O_3$; 0.13 g/l $MnO_2$; 0.97 g/l $TiO_2$; 396 g/l $F_{total}$; 240 g/l $HF_{free}$. The obtained pure solution was processed in the same way as in example 7.

The oxide hydrates of niobium and tantalum, respectively, according to example 7 (products 7.1.1 and 7.2.1) and corresponding products from example 8 are the desired end products.

What is claimed is:

1. A process for the treatment of raw material containing tantalum and/or niobium and other admixture elements comprising the following steps:

A. the raw material is decomposed by a solution containing ammonium fluoride at the boiling point of reaction mixture for not more than 10 hours; said tantalum and niobium and other admixture elements of said raw material are converted into ammonium fluoride complex compounds; exhaust gases from said decomposition consist of ammonia and ammonium fluoride which are recovered by condensation and scrubbing the exhaust gases;

B. the mixture obtained as a result of decomposition stage according to step A is leached with water or a solution containing ammonia at a temperature below 100° C. to remove said ammonium fluoride complex compounds into said water or a solution containing ammonia and leaves insoluble oxides, oxide fluorides and fluorides of admixture elements;

C. the mixture obtained after step B is filtered giving a main filtrate—ammonium fluoride solution containing tantalum and niobium and a sediment of compounds of the admixture elements; the said sediment is washed with ammonium fluoride solution or water, or ammonium solution;

D. the main filtrate from step C is mixed with a solution of $NH_3$ to precipitate the tantalum and niobium;

E. a sediment containing tantalum and niobium precipitated during step D is separated from ammonium fluoride solution by filtering and is than dried and calcined at a temperature not higher than 450° C. for not more than 2 hours to remove ammonia and ammonium fluoride which is recycled for decomposition of raw material according to step A;

F. the sediment containing tantalum and niobium after step E is then dissolved in a solution containing fluoride ions and hydrofluoric acid to prepare a hydrofluoric acid solution containing said metal;

G. subjecting the solution obtained from step F to extraction separation to produce separate aqueous solutions of niobium fluoroacid complex and tantalum fluoroammonium complex H. addition of ammonia to each of the separate aqueous solutions of niobium fluoroacid complex and tantalum fluoroammonium complex produced in step G to precipitate niobium hydroxide and tantalum hydroxide respectively;

I. the sediment of niobium hydroxide precipitated during step H is separated from ammonium fluoride solution by filtering and the sediment of tantalum hydroxide precipitated during step H is separated from ammonium fluoride solution by filtering; ammonium fluoride solutions are used for decomposition of raw material according to step A; and J. the niobium hydroxide from step I is calcined giving a product containing more than 99% of niobium oxide and the tantalum hydroxide from step I is calcined giving a product containing more than 99% of tantalum oxide; and ammonium fluoride is recovered from exhaust gases by scrubbing them.

2. The process of claim 1, in which the sediment of compounds of admixture elements separated in step C of the process is converted into oxides, oxide fluorides or fluorides by drying and calcining; and ammonium fluoride is recovered from exhaust gasses by scrubbing them.

3. The process of claim 2, in which the dried and calcined sediment of compounds of admixture element is a disposable waste product.

4. The process of claim 1, in which the solution, obtained in step C of the process when washing the sediment of compounds of the admixture elements contained in initial raw material, are used during step A of the process as solution of ammonium fluoride.

5. The process of claim 1, in which an aqueous solution of 1.0–1.5% ammonia recovered in step A is used for leaching in step B of the process.

6. The process of claim 1, in which solutions of ammonium fluoride recovered during the process is used for washing the sediments of admixture elements in step C.

7. The process according to claim 1, in which an aqueous solution of ammonia recovered in step A and containing ammonia in an amount of up to 28% is used for ammoniac precipitation and washing the sediment of amnmonium fluoride complex salts or hydroxides of tantalum and niobium in step D.

8. The process according to claim 1, in which parts of a solution from which separate aqueous solutions of niobium fluoroacid complex and tantalum fluoroammonium complex have been extracted in step G are used as a washing solution for scrubbing exhaust gases recovered from calcining the sediment of compounds of admixture elements formed in step B.

9. The process according to claim 8, in which 40–70% hydrofluoric acid is added during the extraction separation in step G of the process to replenish fluoride ion content.

10. The process according to claim 1, in which ammonium fluoride salts in solid form or dissolved form are added at the step A of decomposition of tantalum and niobium containing raw materials to replenish fluoride ion content.

11. The process according to claim 1, in which aqueous solutions of ammonia in an amount of up to 28% recovered in step A is used for ammoniac precipitation of niobium hydroxide and sediment of tantalum hydroxide according to step H.

12. The process of claim 1, in which a solution from which separate aqueous solutions of niobium fluoroacid complex and tantalum fluoroammonium complex have been extracted in step G is used during step F of the process as the solution containing fluoride ions and hydrofluoric acid for preparing a hydrofluoric acid solution containing tantalum and niobium and suitable for separation of tantalum and niobium by means of multistage liquid-liquid extraction.

13. The process of claim 1, in which ammonia and ammonium fluoride are regenerated by condensation or scrubbing of exhaust gases from steps A, E, J of the process and any calcining the sediment of admixture elements formed in step B.

* * * * *